Nov. 23, 1926.
W. S. CLOUD
1,608,302
PROCESS FOR MAKING CONFECTIONS
Filed Dec. 19, 1924
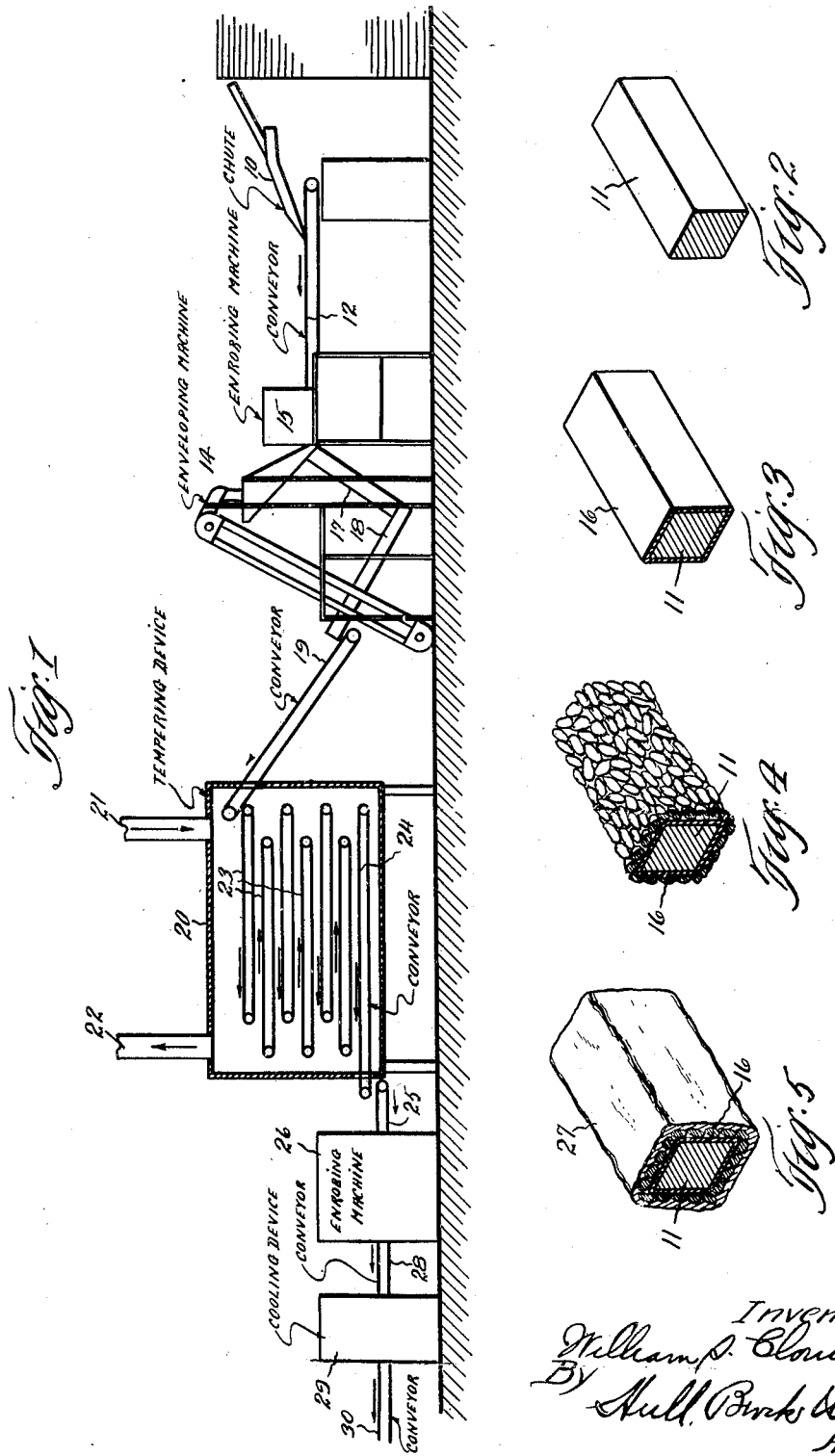
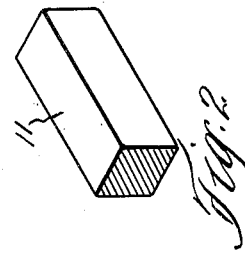
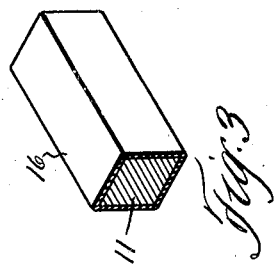
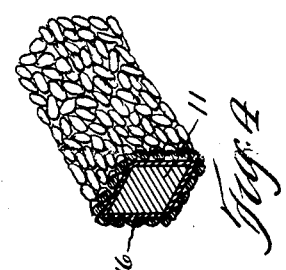
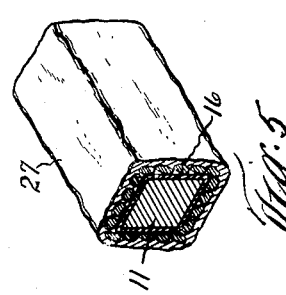
Inventor
William S. Cloud
By Null, Burks & West
Attys.

Patented Nov. 23, 1926.

1,608,302

UNITED STATES PATENT OFFICE.

WILLIAM S. CLOUD, OF CLEVELAND, OHIO, ASSIGNOR OF ONE-HALF TO THE EUCLID CANDY COMPANY, OF CLEVELAND, OHIO, A CORPORATION OF OHIO.

PROCESS FOR MAKING CONFECTIONS.

Application filed December 19, 1924. Serial No. 756,899.

This invention relates to a new and improved process for making confections, as for example, candy confections which consist of a center that is enveloped with a multiplicity of edible units and then enrobed with a finishing coating such as chocolate.

The primary object of the present invention is to provide a continuous process for manufacturing confections so that it shall be unnecessary to handle the same from the time the centers or uncoated pieces are fed to the machine until they are ejected as finished confections ready for wrapping and boxing, thereby materially expediting the production of the confections and effecting a large saving in the cost of making the same.

Another object is to provide a continuous process whereby more uniform and better grade confections may be produced than is possible by the hand process which involves considerable handling of the pieces.

With these and other objects in view, the invention may be stated broadly to consist in a continuous process including the steps of feeding previously prepared articles through a tempering device to condition the same and then through an enrobing device to coat the conditioned pieces with a finishing material, and finally cooling the coated pieces and conveying the same to be wrapped and boxed. More specifically the invention as disclosed in the accompanying specification and drawing may be stated to consist in the provision of a continuous process which includes the steps of feeding the centers through an enrobing device to coat the same on all surfaces with a viscous material such as caramel, then enveloping the coated centers with a multiplicity of edible units such as peanuts, tempering the pieces thus formed, then enrobing the tempered pieces with a coating of finishing material such as chocolate, and finally cooling the finished pieces and conveying them to be wrapped and boxed.

In the drawing accompanying and forming a part of this application, Fig. 1 is a view illustrating a machine for carrying out my improved process, and Figs. 2, 3, 4 and 5 are perspective views in section showing respectively the center as it is fed to the machine, as coated with caramel, as enveloped with peanuts, and as enrobed with chocolate.

In carrying out my improved process for manufacturing a confection such as the piece known as "Love Nest", I preferably employ a machine such as illustrated in Fig. 1, wherein 10 denotes a chute for feeding the centers 11 onto a conveyor 12. These centers in the present instance are made of caramel and are oblong in shape. The chute 10 serves to feed the centers onto conveyor 12 with their longitudinal axes parallel with the longitudinal axis of the conveyor. The centers are conveyed in this order to a combined enrobing and enveloping machine indicated generally at 14 which may be of the type shown and described in Patent No. 1,462,883, issued to me July 24, 1923. This machine consists of an enrobing device 15 which floods the centers with a coating 16 of a viscous material such as hot caramel, on all surfaces thereof and then discharges the coated centers through a shower of edible units such as peanuts and then onto a bed 17 of such units. The centers roll down the incline 17 by gravity thus completely enveloping the same with peanuts and from thence they are conveyed upwardly on a bed of peanuts at 18 thereby insuring complete commingling of the coated centers with the units. Adjacent the upper end of travel the centers are automatically separated from the loose peanuts and the centers are discharged onto a suitable conveyor 19 which conducts them to a cooling device 20. The cooling device 20 consists essentially of an enclosure to which cold air is conducted by a pipe 21 and discharged at 22. Within this enclosure are a plurality of conveyors 23 which are arranged in staggered relation and which move in opposite directions, such arrangement being used in the present instance instead of a single long conveyor in order to conserve space and obtain a compact unit.

The coated and enveloped centers discharged from the combined enrobing and enveloping machine 14 are still warm due to the hot coating of caramel and if the final coating of chocolate were applied to the centers immediately, the chocolate would either set very slowly or would set temporarily and then soften again causing the chocolate to have an undesirable grayish appearance when they finally become cool and hard. In order to overcome this difficulty, I temper the pieces by passing the peanut coated centers through the cooling device 20 above referred to. The centers are discharged onto the upper conveyor within the enclosure and move to the left as viewed in Fig. 1, then discharged on the conveyor immediately thereunder and move to the right, and so on until the bottom conveyor 24 is reached, at which time, the centers will have been tempered or cooled throughout to a temperature normally below the melting point of the final coating of chocolate which is to be applied. While I have shown and described the enclosure 20 as a cooling device for the manufacture of the specific confection described, it is obvious that hot air could be applied to the enclosure if it is desired to temper other pieces by applying heat thereto.

The lowermost conveyor 24 in the cooling device preferably extends through a wall of the enclosure and serves to conduct the cooled pieces to a conveyor 25 which is preferably so constructed that the peanut enveloped centers will be aligned thereon with their longitudinal axes parallel with the longitudinal axis of the conveyor irrespective of the order in which they are delivered to this conveyor. The confections are thus delivered to an enrobing machine 26 which is of any standard or approved construction and this machine enrobes the peanut enveloped centers with a coating 27 of chocolate on all surfaces, and as they pass through the machine, the excess coating is blown or otherwise removed from the articles.

The coated pieces emerge from the enrobing machine 26 on a conveyor 28 which carries them to a cooling device 29 which may be similar to that previously described. This device serves to cool and harden or set the final coating of chocolate.

From the cooling device 29, the pieces are discharged onto a conveyor 30 which conducts them to suitable wrapping stations (not shown) where they are wrapped and boxed ready for shipment.

While I have shown and described a continuous process for manufacturing a confection such as "Love Nest", it will be understood that my process could be applied equally well to other confections consisting of an edible center which is to be tempered and then coated with one or more coatings.

The foregoing process is carried out as a continuous operation so that it is unnecessary for the pieces to be handled during the manufacture thereof and hence the production is materially increased and a more uniform article is obtained.

Having thus described my invention, what I claim is:—

1. The process of making confections which consists in continuously moving centers through a coating of hot caramel to enrobe the centers, thence without appreciable cooling through a shower of nuts to partially envelope the enrobed centers, thence moving and commingling the nuts and enrobed centers to completely envelope the centers, thence through a cooling device to cool the pieces thus formed until the same are cooled throughout to a temperature below the melting point of the final coating, thence through a coating of chocolate to enrobe the pieces and finally cooling the chocolate coated pieces.

2. The process of making confections which consists in continuously moving centers and while so moving first applying a coating of hot viscous material to the centers to render the same sticky, second without appreciable cooling applying a multiplicity of edible units to the sticky surface of the centers, third cooling the pieces thus formed until the same are cooled throughout to a temperature below the melting point of the final coating, and fourth applying a coating of finishing material.

In testimony whereof, I hereunto affix my signature.

WILLIAM S. CLOUD.